Figure 1:
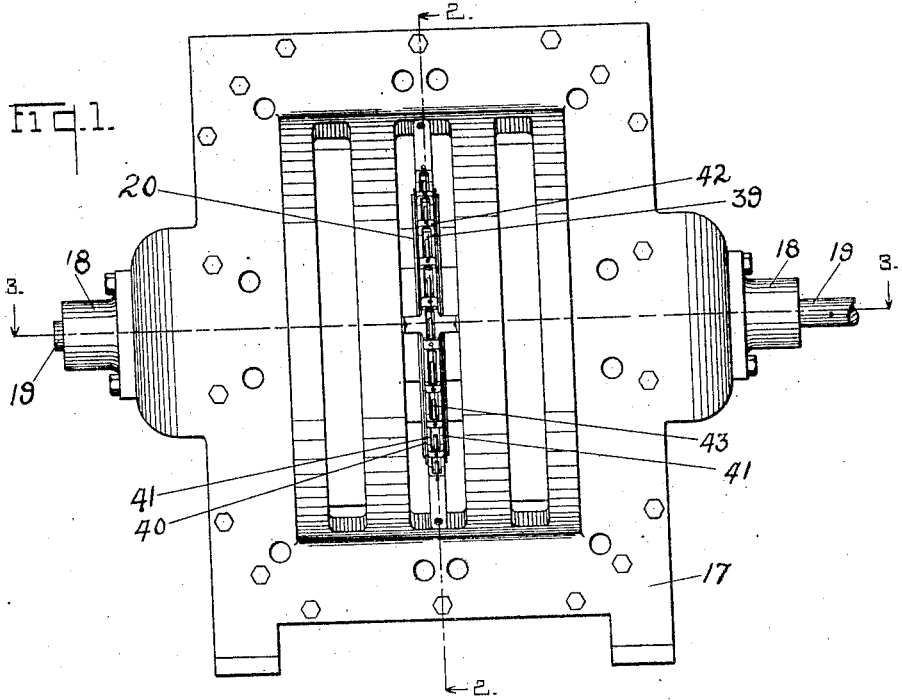

Nov. 18, 1924.

G. S. TOWAR 1,516,254

HOMOPOLAR DYNAMO

Filed Aug. 1, 1921

5 Sheets—Sheet 1

INVENTOR
George S. Towar
by
Owen, Owen & Campton

Nov. 18, 1924. 1,516,254
G. S. TOWAR
HOMOPOLAR DYNAMO
Filed Aug. 1, 1921   5 Sheets-Sheet 2
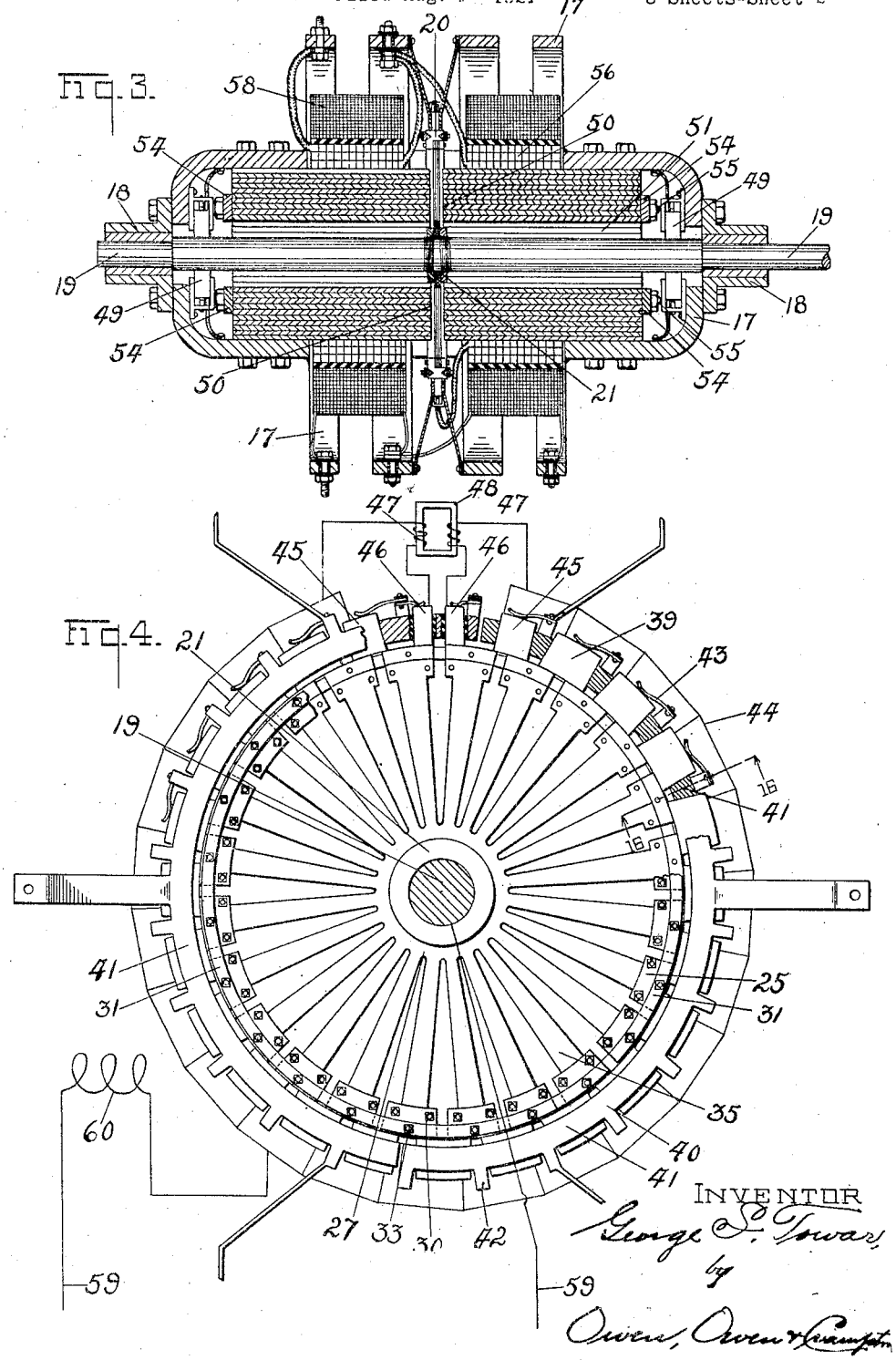

Nov. 18, 1924.  
G. S. TOWAR  
1,516,254  
HOMOPOLAR DYNAMO  
Filed Aug. 1, 1921  
5 Sheets-Sheet 3
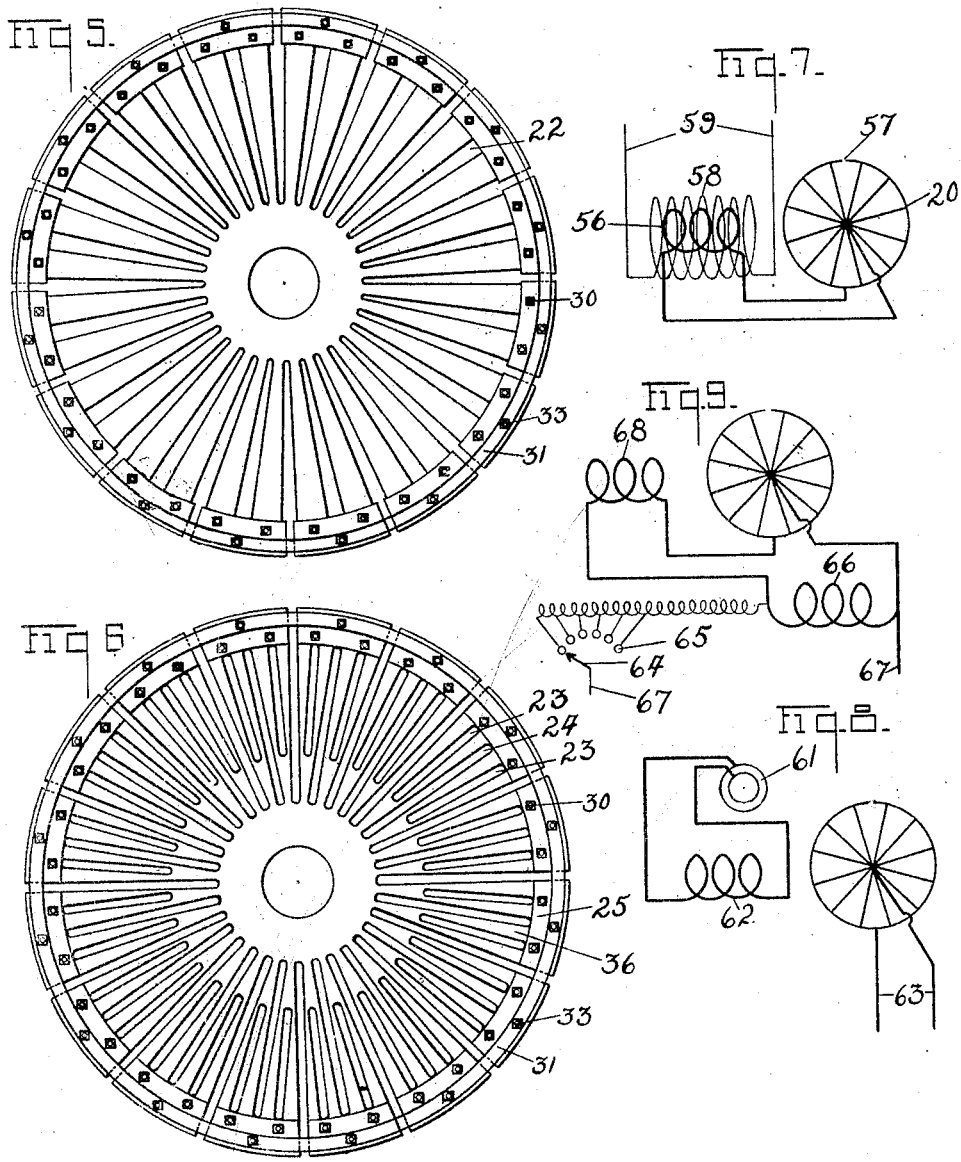
INVENTOR  
George S. Towar.  
by  
Owen, Owen & Crampton Nov. 18, 1924.　　　　　　　　　　　　　　　　　　1,516,254
G. S. TOWAR
HOMOPOLAR DYNAMO
Filed Aug. 1, 1921　　　5 Sheets-Sheet 4
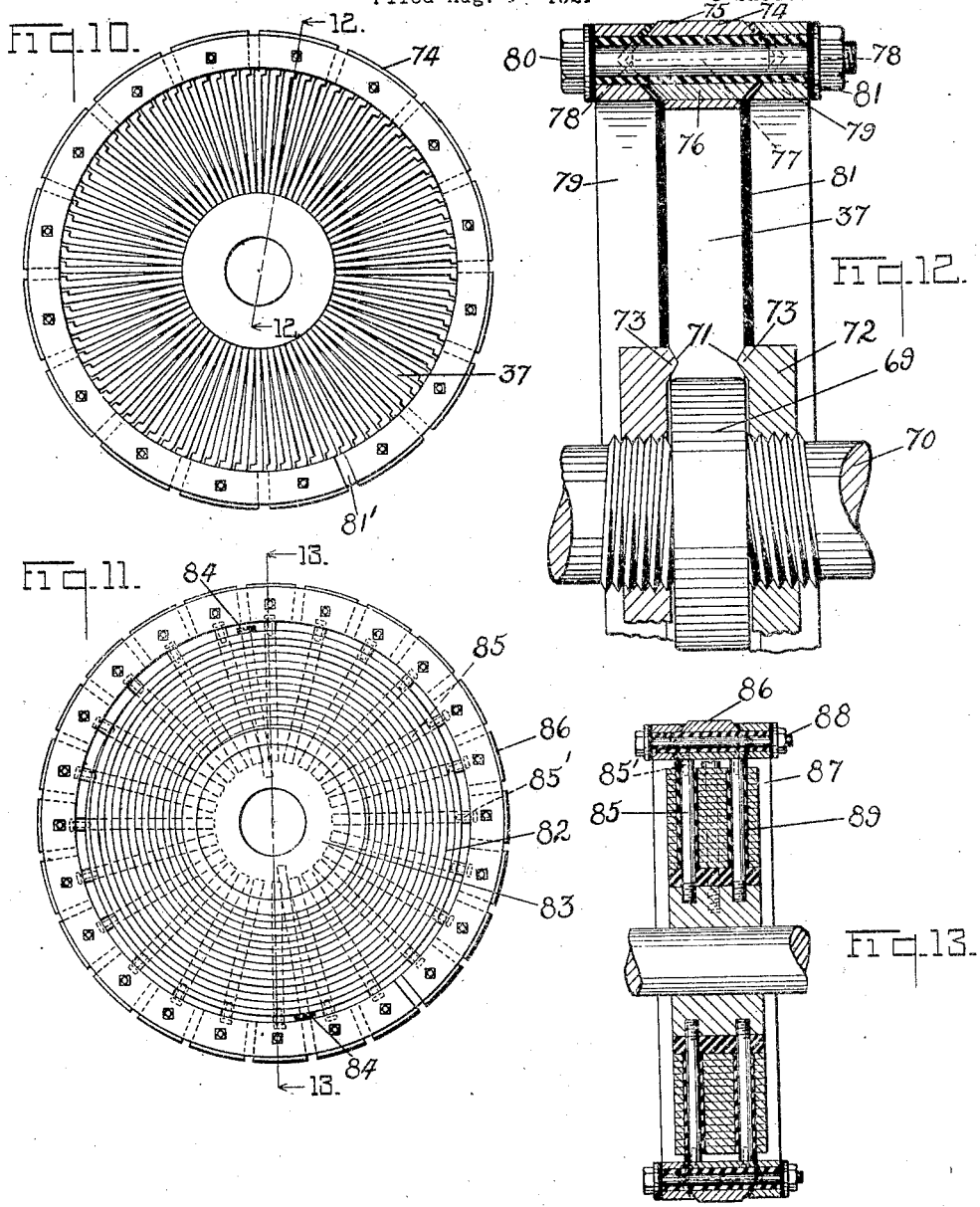
INVENTOR
George S. Towar
by
Owen Owen & Crampton

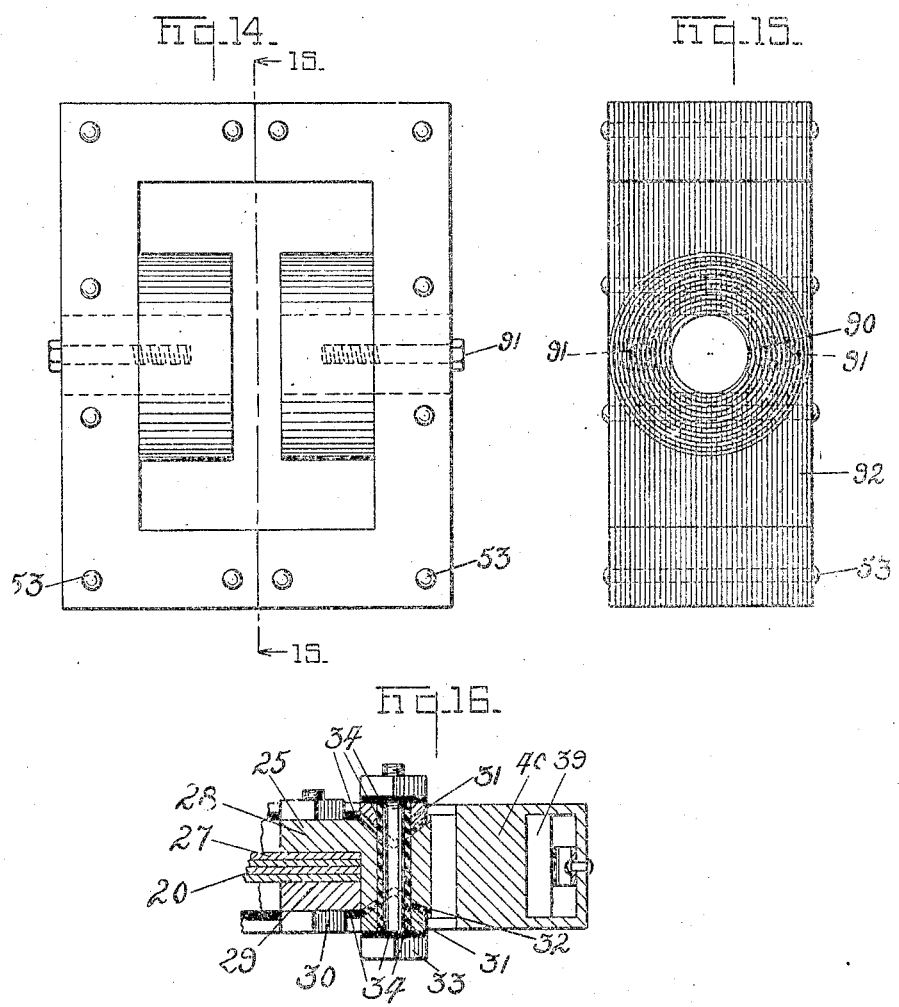

Patented Nov. 18, 1924.

1,516,254

UNITED STATES PATENT OFFICE.

GEORGE S. TOWAR, OF TOLEDO, OHIO.

HOMOPOLAR DYNAMO.

Application filed August 1, 1921. Serial No. 488,797.

*To all whom it may concern:*

Be it known that I, GEORGE S. TOWAR, a citizen of the United States, and a resident of Toledo, in the county of Lucas and State of Ohio, have made an invention appertaining to Homopolar Dynamos; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an alternating current dynamo of the homopolar type of construction and has for its primary object to produce a simple, efficient, low cost alternating current dynamo with certain distinctive operating characteristics not found in other alternating current dynamos.

The invention has also for its object to provide an alternating current dynamo that when used as a generator will produce an alternating current having a frequency which is independent of the speed of rotation of the rotor of the dynamo and a freqency of the current produced which is the same as that of the alternating current that is used to excite the field of the dynamo.

By my invention I have produced, when the dynamo is used as a generator, a means whereby the frequency and the power that is introduced into a main line may be readily adjusted to the translating devices that may be connected to the line and obtain from the translating devices certain desired results in the most efficient manner. For instance, if induction motors or synchronous motors are connected to the main line circuit they will have a speed of rotation which will be dependent upon a frequency of the alternating current excitation of the fields of the homopolar dynamo. Therefore, if it is desired to change the working conditions of the motors it may be readily done by merely changing the frequency of the field excitation of the dynamo. This will give a very large latitude of operating conditions for the motors connected to such a line.

The invention also has for its object to produce a homopolar alternating current dynamo which when used as a motor, will give a single phase motor of the series type having series operating characteristics, which motor has higher starting torque, more rapid acceleration, higher overload capacity, and cooler operating temperatures at all loads than do the usual forms of alternating current motors with series motor characteristics.

My motor has no commutation and eliminates the troubles of the single phase series commutator motor and single phase repulsion motor in the destructive heating effects and loss of efficiency due to the transformer action in the short circuiting of armature coils by brushes. These motors also suffer from sparking between brushes and commutator producing roughening of commutator and brushes, causing poor electrical contact between them giving rise to further heating and decreased efficiency. As before stated my invention has no commutation and eliminates the above defects in an A. C. series motor.

The invention may be embodied in alternating current homopolar dynamos of different forms of construction. Either the armature or the field may be made stationary and the other element rotated. Also the rotor may be made in the form of a disc or it may be made in the form of a cylinder, that is to say, the rotor may partake of either the radial or the axial or drum type of construction. The preferred embodiment of my invention is a dynamo of the radial type where the armature is rotated and the field is stationary.

In my preferred type of radial armature rotor the heat will be readily dissipated because the conductors are bare and the air will be caused to readily circulate over their surfaces by the centrifugal action produced in the air by rotation of the armature, consequently an exceedingly large power may be either produced in the armature or be directed through the armature without producing the destructive heating effects that are produced in machines other than those containing my invention. This is true whether the dynamo is used as a generator or as a motor. When used as a motor an exceedingly large torque may be produced continuously or merely for starting purposes. The conductors may be readily formed into shape to accentuate the air flow over the conductors to maintain a relatively low temperature in the armature.

Different types of the alternating current homopolar dynamo will partake of different forms. They may also be varied in their details of construction in order to produce different results in the machines. The homopolar alternating current dynamo embodying my invention readily lends itself to its adaptability of a great variety of alternating current conditions. If desired, the field may have incorporated in it a transformer whereby a relatively small current of high potential may be transformed into a low potential high current in the field itself.

In the preferred form of machine, whether the armature be the rotor or the stator of the machine, the conductors are without insulation other than air, and are very easily shaped and assembled to obtain the desired working conditions of the dynamo. The radial electrical armature conductors may be formed partly or entirely of magnetic material and will then act as the armature magnetic core and will give a light weight and a low cost unit.

Furthermore the armature may be readily constructed so as to greatly reduce the hysteresis and the loss from eddy currents by a sub-division of the conductors of the magnetic material into many conductors in parallel.

To illustrate the practical embodiments of the invention I have selected three or four forms of construction containing the invention and shall describe them hereinafter. The constructions selected are illustrated in the accompanying drawings, in which,—

Figure 2:
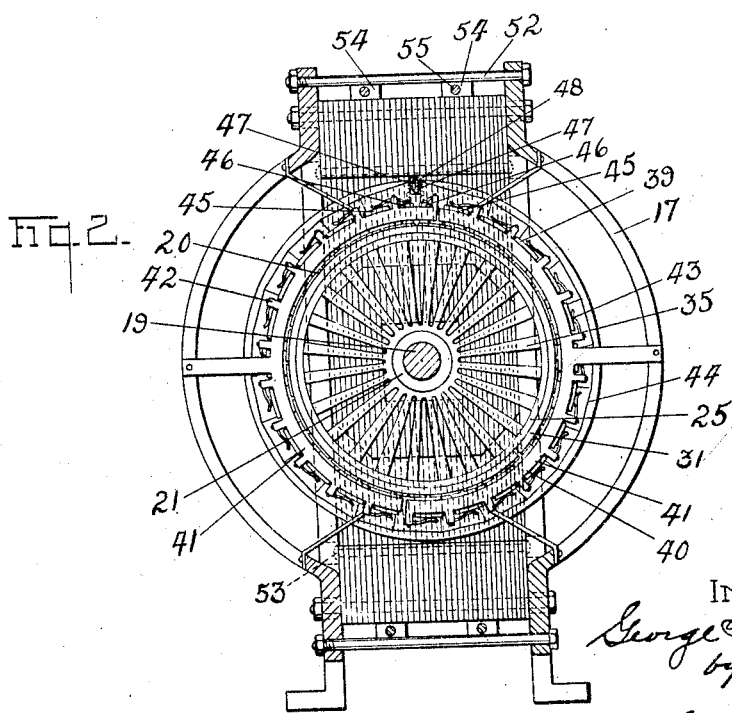

Figure 1 illustrates a side view of a homopolar dynamo containing my invention. Fig. 2 illustrates a sectional view taken on the line 2—2 indicated in Fig. 1. Fig. 3 is a sectional view taken on the line 3—3 indicated in Fig. 1. Fig. 4 is a side view of the disc rotor armature showing the radial conductor shown in Figs. 1 and 2. Figs. 5 and 6 illustrate modified forms of the armature that may be used in alternating current homopolar dynamos embodying my invention. Fig. 7 illustrates diagrammatically the circuit connections of the dynamo illustrated in Figs. 1, 2 and 3. Fig. 8 illustrates diagrammatically the circuit connection of the alternating current homopolar dynamo when used as a generator, the field being excited from an independent source of alternating current. Fig. 9 illustrates diagrammatically the circuit connections of the dynamo used with an external auto transformer. Figs. 10 and 11 show additional modifications of the rotor radial type armature. Fig. 12 is a broken sectional view taken through the axis of the armature shown in Fig. 10. Fig. 13 is a sectional view of the armature shown in Fig. 11. Fig. 14 shows a modification of the poles that may be used in place of the laminated pole pieces used in the form of construction shown in Figs. 1, 2 and 3. Fig. 15 is a face view of one of the poles, and Fig. 16 shows a sectional view taken through the rim of the armature shown in Fig. 4.

Referring to Figs. 1, 2 and 3, 17 is the frame of the machine having the bearings 18, which may be of any well known form in which is suported the rotor shaft 19. In the machine shown in the drawings, the armature is the rotating element of the machine.

The armature 20 is secured to shaft 19 by means of the threaded collars 21, which clamp together the laminations of the armature into which it is divided to obviate, as far as possible, the hysteresis and eddy currents and particularly to enable the manufacture of the armature at a low cost. By forming the armature of sheet metal it is possible to die cut the discs to form the necessary radial arms. The discs being of relatively thin metal may then be compiled to the desired thickness to produce the desired electroconductivity and the required mechanical strength to withstand the high rate of rotation to which the armature is subjected and give sufficient rigidity. The armature is so formed that the portion between the poles of the field is provided with bars, or their equivalents, in spaced relation to reduce eddy currents produced by the changes of the field flux. The radial bars are preferably made of magnetic material in order to reduce the reluctance of the magnetic circuit. As shown in Figs. 4, 5 and 6 the bars may be made in the form of radial spokes or sectors of the disc armature and may be provided with slots 22, 23 and 24 that are so located as to extend across the faces of the poles of the machine.

The discs of which the armature is formed are not only clamped at the center by means of the collars 21 but also by means of clamping rings 31 which are clamped to the outer rim portion 25 of the discs 27 of the armature 20 by means of bolts 30. The rim 25, which is formed of two parts 28 and 29, (see Fig. 16) that are secured together by means of bolts 30, that clamp the parts of the rim to the discs 27 of the armature 20, is formed of a plurality of sections that are separated in spaced relation to each other for the purposes hereinafter described. The sections are mechanically secured in rigid spaced relation by means of the rings 31 that fit into V-shaped grooves 32 formed in the sides of the rim 25, the rings and rim sections being clamped in position by means of bolts 33, and insulated one from another by insulating material 34. The rings 31 are to provide the mechanical strength to hold the spokes and rim sectors rigidly and hold them in their true spaced relationship. This is analogous to the rim of the wheel holding the spokes in spaced relationship. In certain designs of my homopolar dynamo with radial disc type armature, the spokes may have enough strength to hold their spaced relationship under stress and therefore the rings 31 may be dispensed with.

In Fig. 4 each rim section is shown as having a single spoke of the disc connected thereto, while in Fig. 5 each rim section has two spokes connected thereto. In the form shown in Fig. 6 the disc spokes 36 are formed by radial slotting, while in the form shown in Fig. 10 the spokes 37 comprise bars separate from, but secured to the hub and rim portions of the armature. In the form of Fig. 11 the rim sectors are connected to the bars 85.

A plurality of brushes in the form of blocks of graphite 39 are located so as to make contact with the rim sectors. They are supported in a circular cage or brush holder 40 formed of two semicircular numbers 41, (Fig. 4) electrically spaced at their ends and provided at intervals therearound with cross-yokes or bridges 42. To each yoke 42 is connected a spring 43, that presses an associated brush 39 against the disc rim 25. The brushes 39 are electrically connected together by means of wires 44.

The rim 25 is shown split between each radial spoke conductor. There is at least one brush for each rim sector so that no armature conductor will be open circuited any place in a revolution. If the rim were left solid and not split as shown, it is evident that it would act as a closed circuit transformer secondary and not only dissipate a portion of the energy, but heat up the rim considerably. Now, if the rim were split but all the brushes were connected to each other, the closed circuit transformer secondary would still obtain through the electrical connections from brush to brush. To prevent this condition, I have shown a special arrangement of brushes and their electrical connections. All the brushes 39 are the same size and spaced uniformly. Two small brushes 46 (Fig. 4) whose contact faces are spaced from each other the same distance as the gap between rim sectors are used. The contact surfaces of these brushes are only a little longer than the gap between rim sectors. Two brushes 45, which are on each side of brushes 46 are spaced from brushes 46 so that at no position of the rim sectors can there be any electrical path between brushes 45 through the rim sectors and brushes 46.

Moreover the ends of the semi-circular members of the brush holder 40 used for containing the brushes 39 preferably terminate in a diameter that passes through the axis of rotation of the armature and is located somewhere between the brushes 45 and the brushes 46. The brushes 46 are insulatingly supported in an end portion of one of the semi-circular members 41. Each of the rings 31 are also split at one side to prevent a closed circuit transformer secondary through these rings 31.

The low resistance circuit through the brushes 39, 45 and 46 will terminate somewhere between either the brushes 45 and 46 or between the brushes 46 and in order to prevent a closed circuit secondary action in the line formed by the wire 44 and the contact brushes, two leads from the brushes 46 are connected through reactance coils 47 surrounding a closed magnetic circuit formed by the core 48, the coils being so wound that the direction of current endeavoring to flow in the closed circuit transformer secondary, which would otherwise be formed is choked to a minimum amount, but the current flowing through the armature circuit is not opposed by the reactance producible by the coils 47, with net results substantially the same.

The external circuit is connected to the wire 44 and to the center of the armature disc such as to the shaft 19, by means of the brushes 49 that are supported by the frame 17. The brushes 49 operate to ground the armature to the frame.

The field core of the homopolar dynamo machine of the form shown in Figs. 1, 2 and 3 has a shape substantially the same as the shell type transformer core, with the exception that the middle leg is opened sufficiently crosswise to receive the disc armature. The portions of the core located on opposite sides of the armature form the poles 50 of the dynamo. An opening 51 is formed in the middle leg lengthwise sufficient to permit the armature shaft to pass through the poles. The opening 51 is made larger than the shaft in order that the slots or spaces formed between the bars of the armature may extend completely across the face of the poles. Also the core is preferably formed into two parts and the two parts secured by the frame 17, as shown in the form of core illustrated in Fig. 14, in order that the armature may be secured to the shaft 19 and then the poles may be located on opposite sides of the armature in the assembling of the machine. Also by this arrangement field coils may be readily placed upon the poles of the machine. In order that the laminations of the field may be held in position during the asembling of the machine, they may be riveted together, as by the rivets 53 shown in the form of field illustrated in Fig. 14.

The core is laminated in a manner well known in the art, and the sheet material that forms the laminations are clamped by the frame 17 and the bolts 52. In order to give substantially a cylindrical form to the shape of the poles that are formed by the layers of sheet material, the outer layers are cut consecutively narrower in the parts that form the poles of the dynamo. This will give a substantially octagonal shape to the poles in the manner well known in the art.

Also in order that the two parts of the field core may be securely held in position they are clamped toegther by means of the bars 54 and the bolts 55. The bars 54 extend vertically across the ends of the cores and the bolts 55 extend horizontally across the top and the bottom of the machine. This forces the abutting faces of the split in the field core tightly together to keep down the magnetic reluctance.

The machine will operate as a motor when a current is passed through the bars from the periphery of the armature to the shaft. The current will thus pass across the lines of force of the field between the poles and the reaction between the current and the field of the dynamo or the reaction between the field of the current and the field of the dynamo causes the armature to rotate according to the direction of the current. To cause the machine to operate as a generator the armature is rotated and a current will be induced in the bars which is collected by the brushes, one in contact with the periphery of the armature and the other in contact with the shaft.

In the form of the invention shown in Figures 1, 2 and 3 the circuit connections through the dynamo are diagrammatically illustrated in Figure 7, wherein the low tension coil 56 is connected to the armature 20 having the break in the rim circuit, as indicated diagrammatically at 57. The high tension coil 58 is connected to the line 59. If the machine illustrated in Figures 1, 2 and 3 is a generator the coil 56 acts as the primary coil and transforms the current produced by the generator to a high voltage current that is directed to the line which voltage is suitable for line transmission. If, on the other hand, the dynamo is used as a motor, the coil 56 acts as a secondary coil transforming the energy of the line circuit 59 to a current of low voltage and high amperage which is conducted through the armature and which is necessary for a machine of this type. If the circuit of the line 59 has a low voltage and high amperage current, it may be connected directly to the machine, as indicated diagrammatically in Figure 4, wherein the coil 60 is connected directly to the line 59 and to the armature through the brushes surrounding the armature, and the armature is connected to the other side of main line 59. Similarly the machine will act either as a generator or a motor to produce a current or to produce motive power.

In Figure 8 are shown diagrammatically connections wherein the armature is connected to an external circuit and the field is separately excited from an independent source. The alternating current generator 61 is connected to the field coil 62 and the armature is connected to the line circuit 63.

In Figure 9 the connections are substantially the same as that shown in Figure 7, except that an external auto transformer is used for stepping current either down or up depending on whether the dynamo is used as a motor or a generator. In the auto transformer shown in Fig. 9, I have indicated diagrammatically the means for varying the ratio of the transformation by the movement of the contact arm 64 and the tapped contacts 65. The machine voltage will be the same as the voltage of the coil 66 which will be the voltage transformed from the main line 67 by the auto transformer. The field coil 68 is located in series with the armature and the two are connected to the terminals of the coils 66.

The homopolar type of construction has the armature conductors influenced continuously by the same field pole. This is in distinction to other types of electric dynamo design in which the armature conductors are successively influenced by different field poles. The homopolar design cannot use a number of armature conductors in series (to increase the voltage generated) without bringing the ends of the armature conductors out of the influence of the field and making connections outside. This means a multiplicity of collector rings and sliding contacts. This complicates the design, makes the apparatus bulky and lowers the efficiency.

The single radial disc type having only one armature conductor (many conductors in parallel being thought of as one conductor), is the simplest, most efficient, and cheapest to build. However, this type has such a low voltage that it has a very restricted commercial application in the D. C. machine. Now, in designing this machine for alternating currents, use can be made of the stationary transformer between the dynamo and the line to make the line voltage and machine voltage independent of each other. Therefore, the machine voltage can be any value best suited for economical and efficient design and the transformer adapt the voltage to whatever line voltage is desired. To give cheaper total cost to this combination, the transformer may be incorporated in the dynamo, the transformer core and the field core being the same, while the dynamo field would consist of a few turns of heavy wire and act as a primary coil if the machine were a generator and a secondary if the machine were used as a motor. A winding on the same core of many turns of finer wire would be the high voltage secondary coil, if the machine were used as a generator and the high voltage primary coil if the machine were used as a motor.

In the generator application of this invention a very striking feature is the independence of the speed of the rotating element and the frequency of the alternating current produced. In the ordinary alternating current generator, the frequency of the current produced is absolutely dependent on the speed of rotation. However, in the homopolar alternating current generator, the frequency produced is entirely independent of the speed of rotation and depends only on the frequency of the alternating current field exciting current. As a practical application of this feature may be cited the fact that the prime movers of these generators will not have to have precise speed regulation to keep a constant frequency as is now necessary with the present day alternating current generators. The precise speed regulation of the exciter prime mover is much easier to accomplish as this is a small unit and more easily handled. Then there are certain applications where a variable frequency is desirable. Wide variation of the speed of the generator prime mover is not always easy or desirable whereas the exciter prime mover being a relatively small machine it is much more easily made for a wide speed range. In this connection the exciting generator is a synchronous machine.

If the homopolar generator is not separately excited from an independent source of alternating current it cannot function, as it is not self exciting. However, with the field and armature in series, it is readily seen that the generator will operate in parallel with an A. C. line fed by a synchronous generator.

In the motor application, the alternating current homopolar series motor will have a broad application. Here it might be well to point out that the shunt type of this motor is not practical because of the high inductance of the shunt field making the magnetic flux generated from the field and armature badly out of time phase. The series motor has the field and armature circuits in series, therefore the currents and the fluxes are in time phase with each other.

The A. C. homopolar motor may be of the disc or axial type and may have more than one armature conductor in series by bringing the end connections of each conductor out by sliding contacts and making the series connections outside of the armature. Either the field or the armature may be the rotating element. However, the single radial disc type is much the simplest and cheapest to build and it is altogether the most satisfactory.

The single radial disc type has a simple field core construction being preferably made similar to the core of a shell type transformer. The field coils are simple, form wound coils, being approximate ring shaped. They have large radiating surfaces for heat dissipation. In the preferred type of disc armature the conductors are not insulated by any material, but air and the inherent fan action of this design gives excellent self cooling properties. This allows high power capacities per unit of weight and high overload capacities.

The homopolar series motor containing my invention is an alternating current motor of true series characteristics. It is most admirably suited for electric traction, elevators, pumps, compressors and certain machinery drives with heavy load swings. In fact, in any application where the load is inherently connected to the motor, where high starting torque and rapid acceleration is desired, where frequent starting under load is necessary, where high overload capacity is desirable, where the speed can vary approximately inversely with the torque, so that the pull from the line is not excessive.

In the radial disc types of armature illustrated, the disc is subdivided into a number of radial conductors in parallel. This is done to keep down the eddy current and hysterisis losses.

It is evident that any closed conducting circuit around the field core such as a continuous rim of the armature disc or a complete circle of connections from brush to brush of the current collectors at the rim of the disc, would give a transformer action for the dissipation of energy and therefore the rim must be split into several sections and a special scheme of connections of brushes used as previously described. For the same reason it is obvious that it is desirable to split the ring, which mechanically clamps the rim sections, at one point. For maximum mechanical stiffness, it is desirable to have the split in the ring on one side come diametrically opposite the split in the other ring. Therefore it is obvious that the rings must be insulated from each other.

In the form of armature illustrated in Figure 10, flat bars 37 are located radially, the major width of the bars being located in the planes that pass through the axis of the shaft. The rods 37 abut centrally the ring 69, which surrounds the shaft 70. The bars 37 are provided with V-shaped notches 71 and rings 72 are provided with ridges 73 that fit the notches 71. The rings 72 are threaded onto shoulders formed on the shaft 70 and thus clamp the bars 37 at their inner ends and hold them in position. The outer ends of the bars 37 are welded or soldered to the rim sectors 74. Each of the rim sectors 74 is split into two parts 75 and 76 along the line indicated at 77, and the parts are held together by forming diamond point ridges 78 at the sides of the sectors 74 and clamping them together by rings 79 having V-shaped channels that fit the side surfaces of the sectors 74, and the bolts 80. Insulating material 81 is located between the rings 79 and the sectors 74 and around the bolts to prevent electrical contact between the parts thus assembled. The rings 79 are cut crosswise, as at 81, shown in Figure 10, to prevent the formation of a complete circuit around the rings. The brushes 39, 45 and 46 make contact with the rim sectors 74 in the same manner as described in the armature shown in Figure 4.

In the form of armature illustrated in Figure 11 a coiled ribbon 82 of magnetic material is secured to a hub 83 by means of bolts 84, and copper bars 85 are the radial armature conductors placed in holes bored through the coiled ribbon 82 and secured into the hub 83. The outer ends of the bars 85 make contact with the rim sectors 86. They may be secured to the rim sectors by means of small bolts 85'. The rim sectors are constructed substantially the same as the rim sectors 74. The form of armatures shown in Figures 11 and 13 are secured in position by rings 87 and bolts 88, which are insulated from each other and from the rim sectors 86 in the same manner that the corresponding parts are insulated from each other in the form of armature shown in Figures 10 and 12. The copper bars 85 moreover are insulated from the coiled ribbon 82 by means of insulating material 89. The connections are made with the parts of the armature in the same manner that they are made in connection with the armature illustrated in Figure 4.

In Figures 14 and 15 are shown a modification of the field core construction. A ribbon of magnetic material is formed into the coil 90 and is secured by means of the bolts 91 to the laminated core 92 to form the poles of the dynamo. The core is formed into two parts, as heretofore described; and the field laminations are secured together by means of the rivets 53. When they are assembled in the frame of the machine they are held tightly clamped together with the poles facing each other in the same manner that the parts of the core shown in Figures 1, 2 and 3 are held clamped by the bars 54 and bolts 55.

Having thus described my invention, what I claim as new, and desire to secure by Letters Patent, is,—

1. In an alternating current homopolar dynamo, the armature having a plurality of radiating conductors, a pair of split rings for binding the ends of the conductors together, a plurality of brushes for making contact sequentially with the conductors for connecting the conductors in parallel.

2. In an alternating current homopolar dynamo, a plurality of radiating armature conductors, a plurality of brushes for making contact with the conductors sequentially and connecting them in parallel and with an external circuit, the connections between the brushes having an opening at one point to prevent a low resistance path between all of the brushes.

3. In an alternating current homopolar dynamo, a plurality of radiating armature conductors, a plurality of brushes for making contact sequentially with the outer ends of the radiating conductors and for connecting the conductors in parallel, the brushes being so disposed as to form an electrical gap between two adjoining conductors in the circuit.

4. In an alternating current homopolar dynamo, a plurality of radiating conductors, a plurality of brushes for making contact sequentially with the outer ends of the radiating conductors and for connecting the conductors in parallel, the brushes being so disposed as to form an electrical gap between two adjoining conductors in the circuit, and a reactance or resistance device located in the circuit of the adjoining brushes located in opposite sides of the gap.

5. In an alternating current homopolar dynamo, a plurality of radiating conductors, a plurality of brushes for making contact sequentially with the outer ends of the radiating conductors and for connecting the conductors in parallel, the brushes being so disposed as to form an electrical gap between two adjoining conductors in the circuit, a reactance or electrical resistance located in the circuit of the adjoining brushes located in opposite sides of the gap.

6. In an alternating current homopolar dynamo, the armature formed of a spiral ribbon of magnetic material, conductors radially extending from the axis of the armature, means for insulating the conductors from the ribbon, brushes for making contact with the ends of the conductors in sequence.

7. In an alternating current homopolar dynamo, the armature of the dynamo having a plurality of radiating conductors, the conductors divided into sets, collector segments connected to each set of conductors, and brushes for making connection with the segments in sequence.

8. In an alternating current homopolar dynamo, the armature having a plurality of conductors, brushes for connecting the ends of the conductors in parallel and so arranged with respect to each other as to form a gap in the connections between two of the consecutive conductors, a balanced reactance device for connecting together the said two consecutive conductors.

9. In an alternating current homopolar dynamo, a plurality of conductors, brushes for connecting the conductors in parallel, the brushes, except two consecutive brushes, connected together electrically.

10. In an alternating current homopolar dynamo, a plurality of conductors, brushes for connecting the conductors in parallel, the brushes, except four consecutive brushes, connected together non-inductively, and a balanced reactance device for connecting each of the two middle brushes with its adjacent outside brush.

In testimony whereof I have hereunto signed my name to this specification.

GEORGE S. TOWAR.